(12) United States Patent
Noda et al.

(10) Patent No.: US 6,755,904 B2
(45) Date of Patent: Jun. 29, 2004

(54) NATURAL PAINT AND METHOD FOR MANUFACTURING THE SAME

(75) Inventors: Taizo Noda, Kanagawa (JP); Yasushi Kaga, Kanagawa (JP); Takeshi Oshima, Kanagawa (JP)

(73) Assignee: Cerarica Noda Co., Ltd., Kanagawa-Ken (JP)

( * ) Notice: Subject to any disclaimer, the term of this patent is extended or adjusted under 35 U.S.C. 154(b) by 0 days.

(21) Appl. No.: 10/397,342

(22) Filed: Mar. 27, 2003

(65) Prior Publication Data

US 2003/0183126 A1 Oct. 2, 2003

(30) Foreign Application Priority Data

Mar. 27, 2002 (JP) ........................................ 2002-088556

(51) Int. Cl.⁷ ...................... C09D 191/00; C09D 191/06
(52) U.S. Cl. ....................... 106/224; 106/245; 106/147; 106/148.1
(58) Field of Search ............................. 106/147, 148.1, 106/224, 245

(56) References Cited

U.S. PATENT DOCUMENTS

| | | | | |
|---|---|---|---|---|
| 2,423,137 A | * | 7/1947 | Beach | 106/8 |
| 2,467,796 A | * | 4/1949 | Willis | 106/38.6 |
| 2,623,830 A | * | 12/1952 | Lester | 106/245 |
| 3,088,876 A | * | 5/1963 | Buth | 424/64 |
| 4,810,291 A | * | 3/1989 | Osberghaus et al. | 106/10 |

* cited by examiner

*Primary Examiner*—David Brunsman
(74) *Attorney, Agent, or Firm*—Wenderoth, Lind & Ponack, L.L.P.

(57) ABSTRACT

In order to control volatilization or release of organic solvent, especially formaldehyde, and to adsorb them, and at the same time, to improve weather resistance, water resistance, stain resistance and fungus resistance, natural paint is composed of vegetable drying oil, haze wax, candelilla wax and carnauba wax as the main components, and contains at least one or more of rosin, silk powder and component of rice bran.

10 Claims, 1 Drawing Sheet

NATURAL PAINT AND METHOD FOR MANUFACTURING THE SAME

BACKGROUND OF THE INVENTION

1. Field of the Invention

The present invention relates to natural paint that can control volatilization of organic solvents, especially formaldehyde in a room and a method for manufacturing the same.

2. Related Art

Up to now, as wood used for home building, plywood such as a plywood board, a mosaic board or a plying up head lining board and a painted decorative panel have been used, and these building materials have constitution that is strongly glued by synthetic adhesives.

When a house is built using these building materials, space (indoor room) cut off from outside is formed and the building materials are exposed in the room. Even if wallpaper is glued on the wall, synthetic adhesives having fungus resistance performance are often used.

In a house that these building materials are used, there are many cases that the resident complains of symptoms such as irritation of eye and nose, headache, tiredness and drying of throat and skin. The health hazard showing such symptoms is called a sick house syndrome and has become a social problem.

It is considered that the main cause is solvents used for adjustment of synthetic adhesives, for example, formaldehyde (it is also a carcinogen) derived from formalin.

Also, after a house is built, a surface treatment is used in order to protect the pillar and the wallboard or the plywood-made floor and to polish them. As the surface treatment, synthetic resin, for example, emulsified acryl resin polishing agent and a product filled in a synthetic resin bottle with a nozzle for spray is generally used. However these polishing agents often contain solvents harmful for human body.

Accordingly, when a resident treats a surface of floor using a synthetic polishing agent and dries and then rubs with dry cloth, before the polishing agent is dried, the room is filled with volatilized organic solvents, so the ventilation should be fully done. Among commercial polishing agents, there are products having undesirable odor with added perfume for the improvement.

Even if a material containing low harmful substance is used, in the air of a closed room, harmful substances are continued to be released and volatized. If the resident continues to inhale the air for a long term, there is a possibility to become a cause of sick house syndrome.

A surface treatment or a synthetic resin-polishing agent used after a house is built, also releases or volatizes similar harmful substances and have a possibility to become a cause of sick house syndrome.

On the other hand, as paint that does not use synthetic polishing agents and uses natural raw materials, there are animal and vegetable oils and fats or wax, and they are being noticed as paint using natural materials.

However, in these animal and vegetable oils and fats or wax, the drying time after they are applied is slow compared to the case where synthetic resin polishing agents are used, so these natural materials are mixed with organic solvents or oxidation promoters, and thus there are many cases in which organic solvents and oxidation promoters are mixed. Thus, possibly causing a health hazard by adding organic solvent or oxidation promoters.

Also, there are products where oxidation odor occurs by oxidation of paint, so that there are various perfumes are mixed and it is hard to say that natural materials are used.

Further, for paint using such natural materials, from the point of performance and effectiveness as paint, for example, such as weather resistance, release control performance of volatile organic compound (VOC), fungus resistance, bacterial resistance or stain resistance, use of solid type paint is desirable. However, from the reason that they are easy to paint and use, most of them are actually being used as liquid type paint. For that reason, as described above, organic solvents are often used.

Then, one of the objects of the present invention is to control volatilization or release of organic solvents, especially formaldehyde that is a hazardous to health. Also, another object of the present invention is to provide new type natural paint that the performance such as the weather-resistance, fungus resistance and bacterial resistance is improved. A further object of the present invention is to provide natural paint that is easy to paint in spite of being solid type paint.

SUMMARY OF THE INVENTION

In order to solve the above described problems, the present inventors have earnestly studied on these problems and have found where natural paint that the following components are formulated is effective as paint that can control volatilization and release of organic solvents, especially formaldehyde and can adsorb formaldehyde. Accordingly, paint that contains vegetable drying oil, haze wax, candelilla wax and carnauba wax are mixed as the main component, was effective.

Also, the inventors have found that in order to improve the weather-resistance (prevention of color degradation) and the stain resistance in the case of painting on wood, addition of rosin and sericin is effective and in order to improve the fungus resistance, addition of phytic acid is effective.

Furthermore, the inventors have found that for further improvement of painting workability and prevention of oxidative aging, the problem can be solved by blowing inactive gas such as nitrogen gas and carbon dioxide gas into the paint as fine bubbles and dispersing them to make a whip state.

DETAILED DESCRIPTION OF PREFERRED EMBODIMENT

Figure 1:
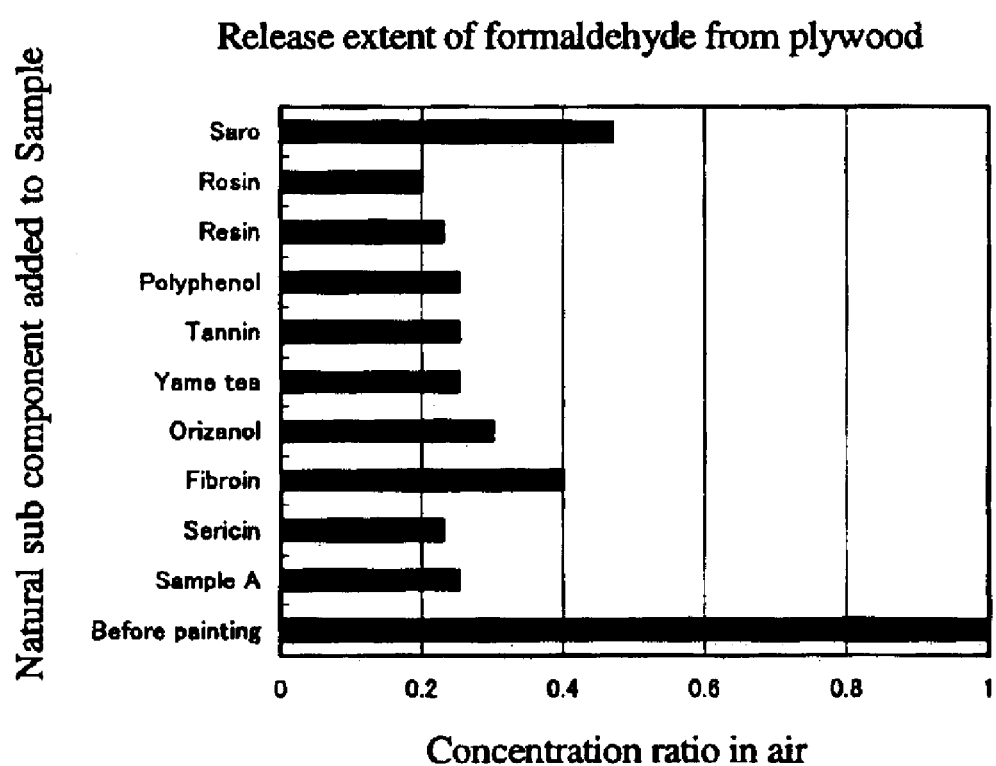
FIG. 1 shows a graph of the measured values in Test example 1.

Then, for further detailed explanation of the invention, the following examples are given.

For natural paint used in the present invention, that is, for surface treatment, the main components consist of 100% vegetable component consisting of vegetable drying oil, candelilla wax and carnauba wax, and in the main components, at least one or more of rosin, silk powder and component of rice bran are contained.

This vegetable drying oil is a component that makes film on a surface of wood floor covering material, and for example, linseed oil, china wood oil, sesame oil, sunflower oil, cannabis oil or perilla oil can be used, and it is desirable to include them from 50 to 90% by weight in the natural paint. In this case, if the content is less than 50% by weight, as the content of wax component in the natural paint becomes relatively higher and the painting workability decreases because the painting amount per unit area increases, and economically, the cost increases. Also, if the content is more than 90% by weight, as the content of wax component formulated becomes relatively lower, the viscosity of the natural paint decreases and it becomes difficult to disperse powder carnauba wax uniformly and separation of oil component after molding becomes occurs easily.

Also, haze wax and candelilla wax formulated are components that adjust the viscosity of the before described natural paint and give luster and moisture resistance to the coated film and it is desirable to include the haze wax from 1 to 30% by weight and to include the candelilla wax from 1 to 30% by weight in the natural paint. For this before described relative loadings between the haze wax and the candelilla wax, viscosity and toughness of haze wax and moisture resistance of candelilla wax are considered.

Further, carnauba wax is a component that gives luster, and it is desirable to include from 0.1 to 30% by weight in the natural paint because, in this case, if the content of carnauba wax is less than 0.1% by weight, the luster decreases, and if it is more than 30% by weight, the slipperiness becomes too much higher.

Furthermore, powder carnauba wax formulated is also a component that makes film having slip resistance, and it is desirable to include the powder carnauba wax from 1 to 10% by weight in the natural paint because, in this case, if the content of the powder carnauba wax is less than 1% by weight, effectiveness for slip resistance decreases, and if it is more than 10% by weight, although effectiveness of slip resistance becomes higher, for example, if it is painted more than the content, slight discomfort often occurs when bare feet contact with the painted surface.

The natural paint contains at least any one or more of rosin and silk powder or component of rice bran as the sub components, and it is desirable to include contain the rosin from 0 to 10% by weight, the silk powder from 0 to 10% by weight and the component of rice bran from 0 to 10% by weight, and it is desirable to include the before described sub components from 2 to 10% by weight in the before described main components.

The rosin and silk powder have higher effectiveness to control release of VOC and also can improve weather resistance. In this case, in order to increase the effectiveness for control of VOC release, it is desirable to add sericin and in order to increase the weather resistance, it is desirable to add fibroin.

Also, as the before described component of rice bran, any one or two of ferulic acid or phytic acid are desirable, and addition of ferulic acid gives ultraviolet absorption effect and addition of phytic acid improves weather resistance owing to metal chelate action of phytic acid. Addition of phytic acid can prevent metallic corrosion and rust and can also obtain the effect of fungus resistance and bacterial resistance, so it can be used even in a high moisture bathroom.

Further, inactive gas is charged in the natural paint. As the inactive gases, nitrogen gas and helium gas are used and also carbon dioxide gas can be used. Here, the case that nitrogen gas is used is described. As a method for charging nitrogen gas, for example, the temperature of the natural paint is kept at about from 20 to 70° C. and the viscosity of the natural paint is adjusted at about from 35 to 100 CPS. Nitrogen gas is blown at a pressure of within 5 atmospheres and the nitrogen gas is stirred using a homomixer or a static mixer to finely disperse the nitrogen gas.

The charge of nitrogen gas like this prevents oxidation of the natural paint under storage and can control occurrence of the oxidation odor. Also, stirring nitrogen gas to finely disperse makes the nitrogen gas to be present in a state of fine bubbles in the natural paint, so the natural paint becomes so called whip state and the product of the natural paint itself becomes soft and the painting process becomes very easy. For this natural paint charged with nitrogen gas, for example, it is desirable to keep in a dead light film evaporated with PET or silica to prevent the surface oxidation.

The natural paint prepared like this can be painted on fittings such as a pillar, a wall, a floor, a metal-framed glass, a fusuma, a sliding door and a door in a room and a ceiling, in short, on every part facing a room. In addition, this product can be applied on furniture (include metallic parts such as a door) such as a sofa, a bed, a table and a cupboard placed in a room, electric products such as a television set and an air conditioner, floor covering such as a tatami and a carpet, a curtain and a blind, leather goods, vinyl house goods and even on leaves or trunks of a plant such as a rubber plant.

Manufacturing Example

50 Kg of purified linseed oil, 10 Kg of purified haze wax, 1 Kg of purified carnauba wax, 10 Kg of purified candelilla wax, 0.5 Kg of ferulic acid, and 1 Kg of rosin are dissolved by heating at a temperature of about from 70 to 100° C. and stirred to mix.

The mixed solution is filtered and cooled at a temperature of about from 20 to 70° C. that purified carnauba wax fine powder does not dissolve, and then dispersed by a homomixer while adding 10 Kg of purified carnauba wax fine powder (powder carnauba wax) and 5 Kg of sericin (fine powder) to prepare the mixture.

Nitrogen gas is blown into this mixture at a pressure of within 5 atmospheres and using a static mixer, the before described nitrogen gas is finely dispersed, and whip state or cream state natural paint is produced.

Then, the test results for the effect of the natural paint obtained like this are described.

Paint that various sub components were added to Sample A consisting of main components (vegetable drying oil, haze wax, candelilla wax, carnauba wax) of the natural paint relating to the present invention was prepared and the test was carried out according to the following procedures.

(1) The prepared paint is painted on plywood, and the control extent of the formaldehyde released from the plywood is measured.

(2) The prepared paint is painted on plywood, and the change of the color difference occurred on the plywood is measured.

(3) The prepared paint was painted on plywood, the presence or no presence of mold on the plywood is measured.

Plywood:

:Teak plywood (40×40×3 mm)

:Linden plywood (40×40×3 mm)

Paint:

:Sample A

:Paint derived from linseed oil (Hemp oil: Obtained from New Age Trading Ltd)

:Saro for door (Paint for Saro: supplied from YKKap Company)

Natural sub components:

:Sericin (Sericin powder: obtained from Fukui Kinu Shoji Company)

:Fibroin (Fibroin: obtained from Fukui Kinu Shoji Company)

:Oryzanol ((extracted from rice bran: obtained from Sanwa Yushi Company)

:Yame tea (produced in Yatume district (obtained from Kawaguchi Kinsuien)
:Tannin (extracted from nutgall: obtained from Taiyo Chemical Company)
:Polyphenol (Extracted from tea leaves: obtained from Taiyo Chemical Company)
:Resin (Extracted from candelilla wax: made by Cerarica Noda Co., Ltd)
:Rosin (China rosin: obtained from Arakawa Chemical Company)
:Phytic acid (extracted from rice bran: obtained from Tsuno Food Industrial Co., Ltd)
:Ferulic acid (extracted from rice bran: obtained from Tsuno Food Industrial Co., Ltd)

Test Example 1

Sericin, fibroin, oryzanol, Yame tea, tannin, polyphenol, resin or rosin powder were individually added to Sample A heated at a temperature of about 60° C. to make 3% by weight and mixed using a homomixer at 7500 rpm for 2 minutes to prepare the paint for various tests. Also, saro for door was used for comparison.

The respective paint for various tests prepared like this was painted on teak plywood two times and dried. A crystalline pan in which the plywood and 100 ml of distilled water were put was placed in a cage and stored at below 23° C. for 24 hours. After the storage was completed, according to the acetyl acetone method specified in JIS A 6922, the formaldehyde concentration absorbed in the distilled water was determined, and the concentration was evaluated as the amount released into air, and then the formaldehyde release control performance of various natural components from plywood was measured.

The results were shown in the graph of FIG. 1, and the final formaldehyde concentration in air in the cage was shown in FIG. 1. As the length of the bar graph is shorter, it shows that the release control performance is higher. This result showed that comparing to formaldehyde amount released from plywood before painting, in the case that Sample A was painted, about 75% of release control was possible, in the case of Sample A mixed with sericin was painted, about 78% of release control was possible and in the case of Sample A mixed with rosin was painted, about 80% of release control was possible. Accordingly, it is understood that Sample A mixed with rosin or sericin is excellent in the formaldehyde release control effect.

Test Example 2

Oryzanol, polyphenol, tannin, rosin, resin, sericin or fibroin were individually added to Sample A heated at a temperature of about 60° C. to make 5% by weight and mixed using a homomixer at 10,000 rpm for 2 minutes.

The respective paint was painted two times on teak plywood that the color before painting was almost similar and dried. After the drying was completed, the sheets of the plywood that the one surface was shielded with aluminum foil were stood on the south of outdoor for one month and the changes of color were observed. After one month, according to Lab value (L; Luminosity, a; Tinge of red, b; Tinge of yellow), the difference of color (E) between the shielded surface (indicated by L; a; b) and the testing surface (indicated by L"; a"; b") was measured and the extent of the change of color was evaluated using the following Equation (1)

$$\Delta E=\{(L \cdot L")^2+(a \cdot a")^2+(b \cdot b")^2\}^{1/2} \quad \text{(Equation 1)}$$

This ΔE was evaluated with 6 grades according to the criteria of the color difference of Table 1.

TABLE 1

| Color Difference | Extent of Color Difference |
|---|---|
| 0.0–0.5 | Slight (almost undistinguishable) |
| 0.5–1.5 | Slight |
| 1.5–3.0 | Sensible |
| 3.0–6.0 | Conspicuous |
| 6.0–12.0 | Well conspicuous |
| 12.0 or above | Very conspicuous |

The differences (ΔE) calculated using Equation 1 are as shown in Table 2. Furthermore, each numerical value in Table 2 shows an average value of 3 times measuring in all cases. As shown in Table 1, as these values are lower, it shows that the color difference is slighter.

Accordingly, it is understood that the paint that fibroin or rosin is added to Sample A is excellent in the effect for the prevention of color change. Also, ΔE of the teak plywood painted with Sample A was more than that of the teak plywood before painting because the sun baked change of color of the teak plywood painted with Sample A was more than the difference of color degradation in the plywood before painting after the test was completed.

TABLE 2

| | Before painting | Sample A | Natural sub component added to sample A | | | | | | |
| | | | Oryzanol | Polyphenol | Tannin | Rosin | Resin | Sericin | Fibroin |
|---|---|---|---|---|---|---|---|---|---|
| ΔE | 2.32 | 2.83 | 4.10 | 2.16 | 1.89 | 1.32 | 2.40 | 2.07 | 1.20 |
| Difference from before painting | — | +0.51 | +1.81 | −0.16 | −0.43 | −1.00 | +0.08 | −0.25 | −1.12 |

Test Example 3

Rosin, phytic acid, ferulic acid, sericin or fibroin were individually added to Sample A heated at a temperature of about 60° C. to make 3% by weight and mixed using a homomixer at 10000 rpm for 2 minutes. Also, paint derived from linseed oil was used for comparison.

The respective paint was painted two times on teak plywood and on linden plywood that the color before painting was almost similar and dried. After the drying was completed, the sheets of teak plywood and the linden plywood that about one-third of them were shielded with aluminum foil were stood on the south of outdoor for one month and the changes of color were observed.

The differences (ΔE) calculated using Equation 1 are as shown in Table 2. Furthermore, each numerical value in Table 3 shows the average value of 3 times measuring in all cases. As this value is lower, it shows that the weather resistance is higher. Accordingly, it is understood that the coating of the paint that rosin, ferulic acid or sericin is added to Sample A is excellent in the weather resistance.

TABLE 3

| | Before painting | Sample A | Natural sub component added to Sample A | | | | | |
| --- | --- | --- | --- | --- | --- | --- | --- | --- |
| | | | Linseed oil | Rosin | Phytic acid | Ferulic acid | Sericin | Fibroin |
| Linden plywood | 7.19 | 6.41 | 7.35 | 6.04 | 7.32 | 6.10 | 6.43 | 6.41 |
| Teak plywood | 3.85 | 1.81 | 1.97 | 1.73 | 2.71 | 2.22 | 1.68 | 2.37 |
| Average value | 5.52 | 4.11 | 4.66 | 3.90 | 5.04 | 4.16 | 4.06 | 4.39 |

The linseed oil in Table 3 shows paint derived from linseed oil, and the average value shows an average value of values of linden plywood and teak plywood.

Test Example 4

Rosin, phytic acid, ferulic acid and sericin or fibroin are individually added to Sample A heated at a temperature of about 60° C. and mixed using a homomixer at 10000 rpm for 2 minutes. Also, paint derived from linseed oil was used for comparison.

The respective paint was infiltrated into filter paper. After the drying was completed, according to the fungus resistance of woody wall paint for indoor 5.16 specified in JIS 5960, the before mentioned filter paper was cut into nearly circular shape of approximately 3 cm diameter and placed on a standard culture medium for bacteria test, and 1 ml of water was scattered on the whole surface of each sheet of filter paper on the standard culture medium, and the filter paper was stored at a constant temperature of 37° C. for 3 days.

The fungus resistance was evaluated with 4 grades according to the criteria of fungus resistance of below Table 4.

TABLE 4

| Extent of Fungus resistance | Occurrence state of fungus |
| --- | --- |
| -- | Occurrence of fungus is not observed |
| - | Occurrence of fungus is slight |
| + | Occurrence of fungus is conspicuous |
| ++ | Occurrence of fungus is very conspicuous |

The results were shown in below Table 5. Furthermore, in Table 5, the measuring was done 2 times. Accordingly, it is understood that the paint mixed with phytic acid or fibroin is excellent in the fungus resistance.

TABLE 5

| | Filter paper only | Sample A | Natural sub component added to Sample A | | | | | |
| --- | --- | --- | --- | --- | --- | --- | --- | --- |
| | | | Linseed oil | Rosin | Phytic acid | Ferulic acid | Sericin | Fibroin |
| Run 1 | ++ | | | | | + | | |
| Run 2 | ++ | | | | | + | | |
| Sum | +4 | 3 | 3 | 2 | 4 | +2 | 3 | 4 |

* The linseed oil in Table 5 shows paint derived from linseed oil, and Filter paper only shows filter paper before infiltration, and Sum shows a total of the results of run 1 and run 2.

As described above, the paint relating to the present invention consists of vegetable drying oil, haze wax, candelilla wax and carnauba wax as the main components, and the obtained natural paint consisting of 100% vegetable component by mixing with the combination of any one or two of rosin and silk powder or component of rice bran can not only control residual organic solvent such as formaldehyde to control the volatilization or release, but also give excellent an effect in that it can absorb harmful substances volatilized or released in air to make clean air. As film having weather resistance, stain resistance, water resistance, alkali resistance, volatile oil resistance and fungus resistance is formed on the surface, as well having as good luster and good appearance. It can solve a health hazard of sick house syndrome and can prevent a change for worse of living environment.

Also, a method for the production of natural paint relating to the present invention comprising dissolving vegetable drying oil, haze wax, candelilla wax, carnauba wax and rosin to mix and filtering the mixed solution and cooling, and then dispersing while adding powder carnauba wax, silk powder and dispersing the mixture by charging nitrogen gas, can produce paint containing 100% vegetable component that does not use any material except natural raw materials. Also, oxidation of natural paint can be not only prevented by finely dispersing nitrogen gas, but also as the product itself is softened to a cream state, the painting process can be done very easily to give an excellent effect for the application.

What is claimed is:

1. Natural paint comprising: vegetable drying oil, haze wax, candelilla wax and carnauba wax as main components, and containing at least one or more of rosin, silk powder, and rice bran component.

2. Natural paint as claimed in claim 1, having been being whipped or emulsified by charging inactive gas or carbon dioxide gas.

3. Natural paint as claimed in claim 1, the content of the rosin, the silk powder, and/or the rice bran component is in the range of from 2 to 10% by weight of the main component.

4. Natural paint as claimed in claim 3, wherein the silk powder is sericin or fibroin.

5. Natural paint as claimed in claim 1, wherein the silk powder is sericin or fibroin.

6. Natural paint as claimed in claim 1, wherein the rice bran component is one or two of ferulic acid or phytic acid.

7. A method for manufacturing natural paint comprising the steps of:

heat-dissolving vegetable drying oil, haze wax, candelilla wax, carnauba wax and rosin to mix;

filtering the mixed solution and cooling;

dispersing it while adding powder carnauba wax, silk powder and rice bran component; and dispersing the mixture by charging inactive gas or carbon dioxide gas.

8. A method for manufacturing natural paint as claimed in claim 7, wherein the vegetable drying oil is from 50 to 90% by weight, the haze wax is from 1 to 30% by weight, the candelilla wax is from 1 to 30% by weight, the carnauba wax is from 0.1 to 30% by weight, the component of rice bran is from 0 to 10% by weight, the rosin is from 0 to 10% by weight, the powder carnauba wax is from 1 to 10% by weight and the silk powder is from 0 to 10% by weight.

9. A method for manufacturing natural paint as claimed in claim 7, wherein the dissolving temperature is from 70 to 100° C.

10. A method for manufacturing natural paint as claimed in claim 7, wherein the cooling temperature is from 20 to 70° C.

* * * * *